INVENTOR
CARL M. DENLINGER
BY
Toulmin & Toulmin
ATTORNEYS

Jan. 30, 1951  C. M. DENLINGER  2,539,816
CROP DUSTING EQUIPMENT FOR AIRCRAFT

Filed Feb. 11, 1948 2 Sheets—Sheet 2

INVENTOR
CARL M. DENLINGER
BY
Toulmin & Toulmin
ATTORNEYS

Patented Jan. 30, 1951

2,539,816

UNITED STATES PATENT OFFICE 2,539,816

CROP DUSTING EQUIPMENT FOR AIRCRAFT

Carl M. Denlinger, Dayton, Ohio

Application February 11, 1948, Serial No. 7,537

13 Claims. (Cl. 244—136)

The present invention has to do with crop dusting equipment and is concerned primarily with such equipment that is used in conjunction with aircraft.

At the present time, the practice of employing aircraft to dust crops with an insecticide is becoming more and more widespread. In accordance with this present day practice, the equipment which is used for this purpose is permanently attached to the aircraft or, stating it in another way, the aircraft is designed and constructed with this sole purpose in mind.

As a practical matter, a crop dusting aircraft is only used for two or three months during the course of a year with the result that it is left standing idle for the larger part of the remaining time. This means that the capital investment represented by the cost of the aircraft is used only a small portion of the time during the year.

With the foregoing condition in mind, the present invention has in view as its foremost objective the provision of crop dusting equipment which is essentially auxiliary in character and which may be attached to an aircraft when it is to be used and removed therefrom when its use is not required, thereby leaving the aircraft free for other purposes.

In carrying out this idea in a practical embodiment, it is evident that the crop dusting equipment must be detachable from the aircraft. Thus, a further object of the invention is the provision of crop dusting equipment of the type indicated which includes means for detachably securing the same to an aircraft.

During the flying of an aircraft there are times when dangerous conditions develop and it becomes necessary to drop all equipment that interferes with the flying operation. With this thought in mind, another object of the invention is the provision of mechanism for detachably securing crop dusting equipment to an aircraft and which mechanism includes an emergency release that may be operated by the pilot of the aircraft while in flight to get rid of the crop dusting equipment. In a practical embodiment, mechanism comparable to the well-known bomb racks is employed to mount the crop dusting equipment on the aircraft. Such a bomb rack includes the emergency release required.

Still another object of the invention is the provision of crop dusting equipment of the type aforesaid which includes as a characteristic element a novel container for the insecticide in dust form and which container has characteristics which provide for the discharge of its contents at the volition of the pilot of the aircraft. In the first place, the container is streamlined. This adapts it to the flying operation without materially increasing air resistance and at the same time provides for the creation of a slip stream which enters into the discharge operation and will be later described.

The container also carries what might be called an inverted keel which is positioned on the top thereof, slightly forward of the center line. This keel cooperates with the bomb rack attachment in mounting the container on the underside of the aircraft wing.

A further object of the invention is the provision in crop dusting equipment of the character noted of a streamlined container, the forward part of which is rigid with the rear part flexible. The slip stream created by flight of the aircraft cooperates with this flexible rear part to cause a shaking or agitation thereof so as to insure discharge of its contents. This construction may be achieved by employing a spider-like frame at the nose and using a fabric envelope which covers this frame and defines the rear part.

Still another highly important object of the invention is the provision in crop dusting equipment of the type aforesaid of a streamlined container which includes a discharge valve at its tail end through which the dust is discharged. As a corollary to this object, a further objective is the provision of means under the control of the pilot of the aircraft for operating said discharge valve.

Various other more detailed objects and advantages of the invention such as arise in connection with carrying out the above noted ideas in a practical embodiment will in part become apparent and in part be hereinafter stated as the description of the invention proceeds.

The invention therefore comprises crop dusting equipment which is designed for detachable connection to an aircraft by connecting means including an emergency release and which includes as an essential element a streamlined container having a rigid front part and a flexible rear part with a discharge valve located at the tail.

For a full and more complete understanding of the invention reference may be had to the following description and accompanying drawings wherein.

Figure 1:
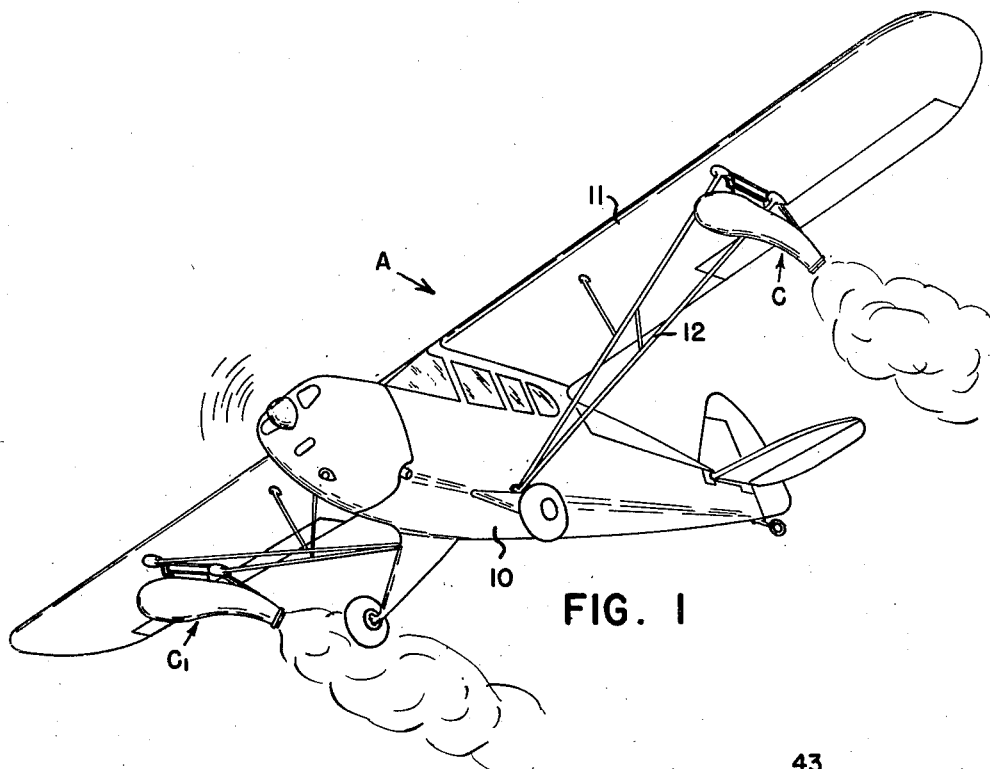
Figure 1 is a perspective illustration of an aircraft in flight and having crop dusting equipment attached thereto in accordance with the precepts of this invention.

Referring now to the drawings wherein like reference characters denote corresponding parts and first more particularly to Figure 1, an aircraft is therein depicted and referred to generally by the reference character A. It will be understood that the aircraft A may be any aircraft that is convenient and adapted to have the equipment to be later described attached thereto. However, it is noted that the equipment is particularly designed for use with aircraft of the lighter type as they cruise at the lower speeds which adapts them to this use. A Piper Cub is a good example of an aircraft which may be employed.

The aircraft A includes a fuselage 10 which houses the seat for the pilot. The fuselage 10 is suspended from wings 11 and the latter are braced by the support shown at 12. In accordance with the present invention it is believed that the crop dusting container should be detachably secured to the underface of the wings substantially at the points where the supports 12 meet the wings. As shown in Figure 1, a pair of streamlined containers C and C1 are mounted on the underside of the wings at the points indicated. Inasmuch as these containers are substantial duplicates only one of them is here described for the purposes of this specification.

Figure 2:
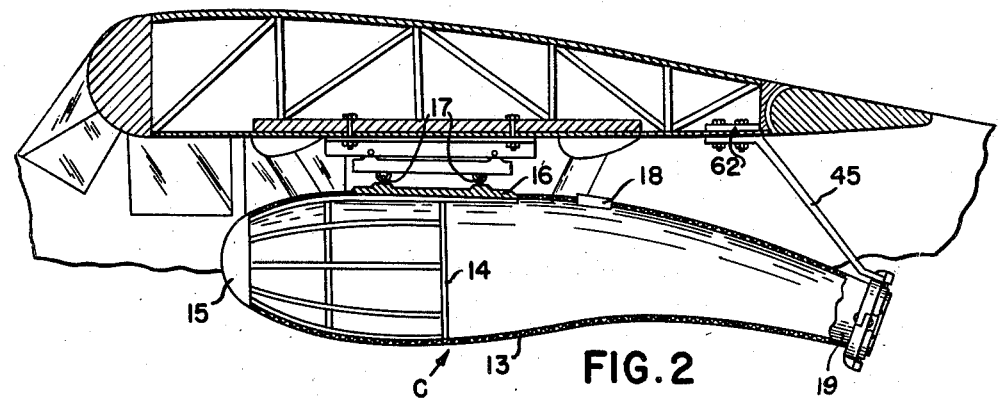
Figure 2 is a section through one wing of the aircraft along the line of one of the streamlined containers.

Referring now more particularly to Figure 2, the container C is shown as being of a generally streamlined formation. This container C comprises a flexible envelope 13 which preferably will be made of fabric having a weave sufficiently close to prevent the dust which the container C is to contain from sifting therethrough or it may be made from a fabric which has been treated with a sizing or other substance to render it dust impervious. A spider-like frame-work 14 is carried in the forward end of the container C and the envelope 13 fits snugly thereover, thereby providing what is in effect a rigid forward part. A nose shown at 15 is secured to the frame-work 14. The latter also has connected thereto a plate member 16 which carries a pair of loops 17 in spaced relation. These loops are for the purpose of detachably securing the container C to the aircraft A as will be later described in detail.

Rearwardly of the plate 16 the container C is formed with an opening that is normally closed by plug 18. The purpose for this plug 18 is to provide for the filling of the container with the insecticide in dust form which is to be discharged therefrom.

Figure 3:
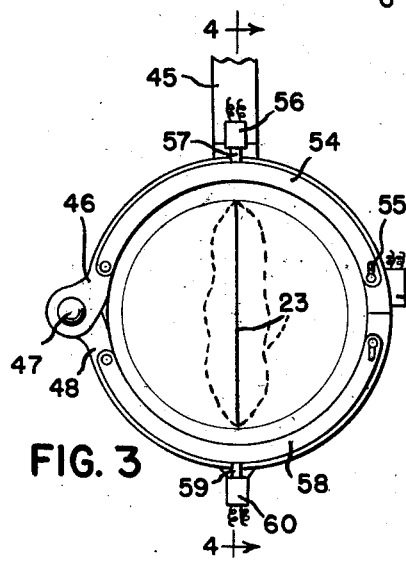
Figure 3 is an end view of the tail of the container looking in from the right side of Figure 2.
Figure 4:
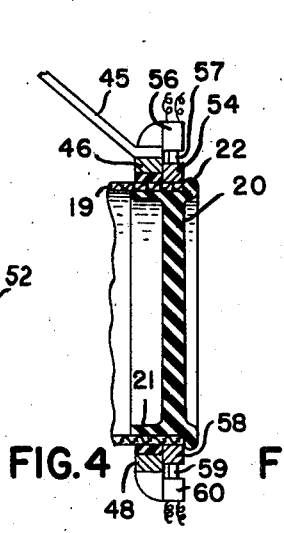
Figure 4 is an enlarged detailed section taken normal to the showing of Figure 3 and about on the plane represented by the line 4—4 of Figure 3.
Figure 5:
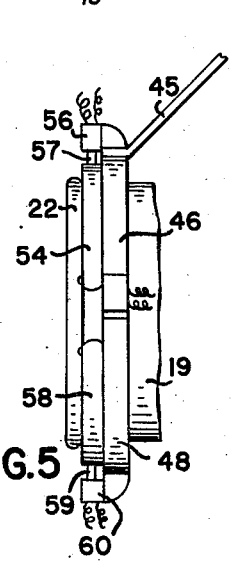
Figure 5 is a view in side elevation of the assembly at the tail of the container.
Figure 6:
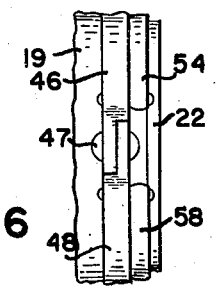
Figure 6 is a view similar to Figure 5 but taken from the opposite side of the tail.
Figure 7:
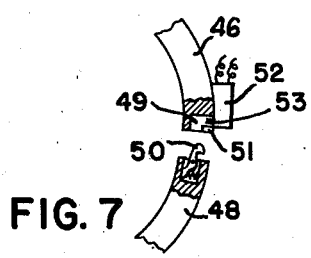
Figure 7 is a detailed representation, partly in section and partly in elevation, showing the tail support when released.

The rear part of the container C is defined by the envelope 13 alone. This rear part gradually diminishes in cross sectional area toward the tail and at the tail takes the form of a substantially cylindrical tube designated 19. This tube 19 carries a discharge valve in the form of a rubber disc 20 that carries a sleeve 21 which snugly fits within the envelope at 19 and an external head 22 which overlies the end of the tail 19. The disc 20 is formed with a vertical slit 23 which normally is closed due to the natural resiliency and elastic properties of the rubber from which the disc 20 is made. However, when the disc 20 is deformed in a manner to be later described, the slit 23 assumes an open position such as represented by the dotted lines of Figure 3. It is through this open slit that the contents of the container C are discharged.

Figure 9:
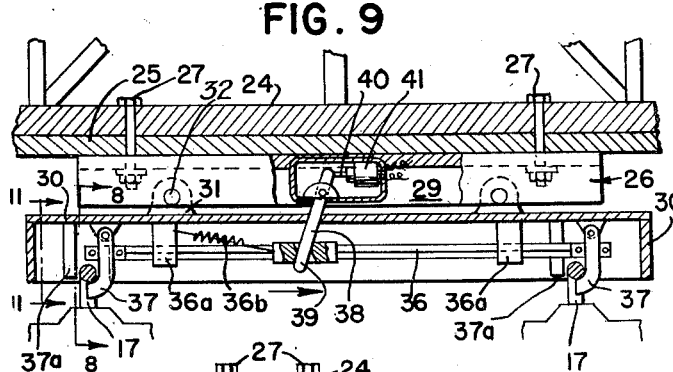
Figure 9 is an enlarged detailed section taken on the plane represented by the line 9—9 of Figure 8.
Figure 10:
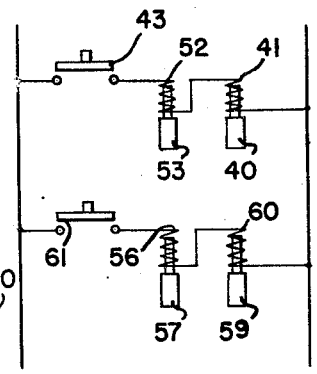
Figure 10 is a wiring diagram representing the circuits for operating the emergency release and opening the discharge valve.
Figures 8, 11:
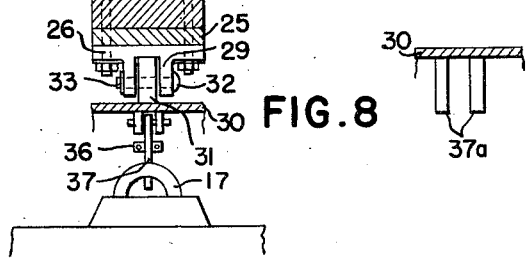
Figure 8 is a detailed sectional view, indicated by line 8—8 on Figure 9, looking in the direction of the longitudinal axis of the container and depicts the connection between the container and the aircraft.
Figure 11 is a view looking in at the stop pins associated with the releasable hooks, and is indicated by the line 11—11 on Figure 9.

Referring now more particularly to Figures 8 and 9, the wing 11 is shown as carrying a fairly substantial plate or structural element 24 on the inside of its lower face. The fabric covering for the wing is shown at 25 as extending over the outer face of the plate 24. A bracket 26 is permanently secured to the under face of the wing 11 by bolt and nut assemblies 27. The bracket 26 carries a pair of downwardly extending flanges 28 and 29 that are spaced apart. A flat, hollow casing 30 is formed with ears 31 which are positioned between the flanges 28 and 29. These flanges, as well as the ears 31, are formed with aligned openings through which extend shackle bolts 32 that are headed at one end and carry a retaining device such as a cotter pin or lock ring 33 at the other end. These shackle bolts are removable so as to provide for the attaching and disattachment of the casing 30 to the bracket 26 as occasion demands.

Pivotally mounted between the opposite flat walls of the casing 30 are a pair of hook members 37 which extend through the bottom of the casing 30 and engage the closed loops 17. A rod 36 is reciprocable in casing 30 as in blocks 36a and engages hooks 37 as shown. It is evident that shifting of the rod 36 in a right-hand direction, speaking with reference to the showing of Figure 9, will cause the hooks 37 to be withdrawn from the loops 17. Such a shifting may be caused by a lever 38 which is pivotally connected as shown at 39 to the rod 36. This lever passes through an opening in the top wall of the casing 30 and which opening constitutes a fulcrum for the lever 38. This lever is disposed between the flanges 28 and 29 and is adapted to be engaged by a plunger 40 of a solenoid 41. When the solenoid 41 is energized the plunger 40 moves the lever 38 in a counterclockwise direction thereby shifting the rod 36 to the right to withdraw the hooks 37 from the loops 17 and release the container. It is therefore evident that should an emergency condition arise the pilot will be able to energize this solenoid 41 and thereby release the containers C and C1. Obviously, the circuit of the solenoid 41 will extend to a point conveniently accessible to the pilot and a control switch shown at 43 will be located thereat. To prevent the loops 17 from slipping off the hooks 37 there may be provided the stop pins 37a as shown in Figures 9 and 12. A spring 36b may be employed for normally urging the rod 36 and hooks 37 into their Figure 9 position.

Referring now more particularly to Figures 2 to 7 inclusive, the structure for supporting the tail of the container and opening the slit 23 will now be described. An arm 45 has its upper end anchored to the underside of the wing 11 by the plate and bolts shown at 62. The lower end of this arm has permanently secured thereto one half of a supporting ring, this half being designated 46. One end of the ring half 46 carries a pivot pin 47 on which is mounted a complemental ring half 48. The ends of the halves 46 and 48 remote from the pivot 47 are formed with complemental elements of a detachable connection. Thus, upon referring to Figure 7, it will be noted that the free end of the ring half 46 has a recess 49 that is adapted to receive a spring biased hook 50. The latter has a bill adapted to engage a detent 51 in the recess 49. A solenoid 52 includes a plunger 53 that is adapted to engage the hook 50 when the solenoid is energized to cause the bill thereof to be disengaged from the detent 51.

This solenoid 52 is placed in the same circuit with the solenoid 41. Thus, when the switch at 43 is closed, both the solenoids 41 and 52 are energized. This not only releases the bomb rack mechanism but causes the ring half 48 to swing away from the ring half 46 on the pivot 47 and thereby release the tail 19.

It will be recognized that under ordinary conditions the ring halves 46 and 48 remain in the closed position illustrated. An arcuate yoke 54 is carried by the ring half 46 and movement relative thereto is provided for by the pin and slot connection shown at 55. Solenoid 56 that is carried by the lower end of the arm 45 has a plunger 57 that engages the yoke 54.

Likewise, a second arcuate yoke 58 is movably mounted on the lower ring half 48 and is adapted to be actuated by a plunger 59 of a solenoid 60.

It is evident that when the solenoids 56 and 60 are energized the plungers 57 and 59 urge the yokes 54 and 58 into contracting relation. This deforms the rubber disc 20 so as to open the slit 23 and permit discharge of the contents of the container.

These solenoids 56 and 60 are included in the circuit of the aircraft and the switch for energizing them which is represented at 61 is located in a position conveniently accessible to the pilot. Moreover, the solenoids for both the containers C and $C_1$ will probably be included in the same circuit so that discharge valves thereof may be opened simultaneously. Of course, it would be possible, through well-known electrical circuits, to provide for the successive discharge of the contents of the containers C and $C_1$.

While the mode of operation of the above described equipment is believed to be obvious, it will be noted that with any deforming forces removed, the slits 23 remain closed. Thus, a container C that is removed from the aircraft may be readily filled by removing the plug 18 and after filling the plug is replaced. The container C, together with the casing 30, is now attached to the aircraft by positioning the ears 31 between the flanges 28 and 29 so that the openings for the shackle bolts align. As this is being done, the lever 38 will be passed through the slot 42. The shackle bolts are now inserted and the cotter pins represented at 33 positioned to hold the shackles in place. The operations above described are repeated for the container $C_1$. At the same time, the ring halves 46 and 48 are swung open to receive the tail 19 and then closed about the tail with the bill of the hook 50 engaging the detent 51 and held in this engagement by the spring which biases the hook 50.

The pilot now takes off and when he desires to discharge the contents of the containers he closes the switch 61. This causes the solenoids 56 and 60 to deform the slits 23 into their open position. At this time, several elements become effective to cause the discharge of the contents. In the first place, the slipstream created by the flight of the aircraft A affects the flexible rear half of the containers so as to agitate and shake them and this action is further enhanced by the vibration of the aircraft. Thus, the contents are discharged through the open slits 23.

Should an emergency condition arise and the pilot be desirous of dropping the containers C and $C_1$, all he has to do is close the switch 43. This energizes the coils 41 and 52. The coil 41 operates the bomb rack and the coil 52 releases the hook 50 at the tail.

While a preferred specific embodiment of the invention is hereinbefore set forth, it is to be clearly understood that the invention is not to be limited to the exact constructions and mechanisms illustrated and described because various modifications of these details may be provided in putting the invention into practice within the purview of the appended claims.

What is claimed is:

1. In combination, an aircraft, a container adapted to receive insecticide in dust form and including means for discharging said insecticide from the rear end of said container, mechanism for detachably securing said container to said aircraft, and connections for operating said discharge means from said aircraft, said container being constructed of flexible material over a substantial portion of its area whereby the slipstream of the aircraft assists in discharging the material from the container.

2. In combination, an aircraft including a wing, an element of a detachable connection on the underside of said wing, a container adapted to receive an insecticide and including means at its rear end for discharging said insecticide from said container, a complemental element of said detachable connection on said container, and mechanism for operating said discharge means from said aircraft a substantial portion of said container adjacent said means being flexible whereby the slipstream of the aircraft brings about agitation of the insecticide in the container.

3. In combination, an aircraft including a wing, a container having a rigid front part and a flexible rear part, said rear part including a discharge opening for discharging the contents of said container and a valve for controlling said opening, a detachable connection between the rigid part of said container and said wing and a second detachable connection between the flexible part of said container and said wing, and mechanism for operating said valve from within said aircraft.

4. In crop dusting equipment of the character described, a streamlined container having a nose, a rigid part contiguous to said nose, and a flexible rear part terminating in a tail, a discharge valve in said tail, means for operating said discharge valve, and elements of a detachable connection carried by said rigid part and tail respectively.

5. In crop dusting equipment of the character described, a streamlined container having a rigid nose part and a flexible tail part, said tail terminating in a rearwardly opening discharge opening, said container being formed with an opening through which it may be filled, a removable plug closing said opening, a discharge valve in said tail for controlling said discharge opening, and an element of a detachable connection carried by said container.

6. In crop dusting equipment of the character described, a streamlined container having a nose, a rigid part contiguous to said nose, and a flexible rear part terminating in a tail, said container being formed with an opening through which it may be filled, a removable plug closing said opening, a discharge valve in said tail, means for operating said discharge valve, and elements of a detachable connection carried by said rigid part and tail respectively.

7. In crop dusting equipment of the character described, a streamlined container including a flexible rear part terminating in a tail, a rubber element carried by said tail and formed with a slit, and means for deforming said element to open said slit.

8. In crop dusting equipment of the character described, a streamlined container including a rigid front part and a flexible rear part terminating in a circular tail, a rubber disc closing said tail and formed with a slit, and means for deforming said disc to open said slit.

9. In combination, an aircraft including a wing, a streamlined container having rigid and flexible parts and adapted to receive an insecticide, said container including means for discharging the contents thereof, a detachable connection between the rigid part of said container and said aircraft wing, an emergency release included as an element of said detachable connection, a second detachable connection between said flexible part and said aircraft wing, an emergency release included as a part of said second detachable connection, means for operating said emergency releases from said aircraft, and connections for operating said discharge means from said aircraft.

10. In combination, an aircraft having a wing, elements of detachable connections secured on the under face of said wing, a streamlined container adapted to receive an insecticide and including a cylindrical discharge spout at the rear end and a valve closing said spout, complemental elements of said detachable connections carried by said container and adapted to cooperate with the first said elements in securing said container to said wing, emergency release means included in said detachable connection, and means operable remotely from said container for selectively actuating said discharge valve or said emergency release means.

11. In combination, an aircraft having a wing, an element of a detachable connection secured on the under face of said wing, a container adapted to receive an insecticide and including a cylindrical rear part having a discharge valve, a complemental element of said detachable connection carried by said container and adapted to cooperate with the first said element in securing said container to said wing, an emergency release included in said complemental element of said detachable connection, and connections for operating said discharge valve and said emergency release from said aircraft.

12. In crop dusting equipment of the character described, a container for insecticide, said container having a tail closed by an elastic member formed with a slit, means for deforming said slit comprising a pair of yokes engaging said element substantially opposite to the ends of the said slit, and means for urging said yokes into contracting relation.

13. In crop dusting equipment of the character described, a container for insecticide, said container having a tail closed by an elastic member formed with a slit, means for deforming said slit comprising a pair of yokes engaging said element substantially opposite to the ends of the said slit, and means for urging said yokes into contracting relation comprising a pair of solenoids each having a plunger engaging one of said yokes.

CARL M. DENLINGER.

REFERENCES CITED

The following references are of record in the file of this patent:

UNITED STATES PATENTS

| Number | Name | Date |
|---|---|---|
| 1,604,290 | King | Oct. 26, 1926 |
| 2,069,996 | Carleton et al. | Feb. 9, 1937 |
| 2,355,084 | Kurrle | Aug. 8, 1944 |
| 2,421,699 | Johnson | June 3, 1947 |

FOREIGN PATENTS

| Number | Country | Date |
|---|---|---|
| 343,661 | Great Britain | Feb. 26, 1931 |